United States Patent [19]
Reither

[11] Patent Number: 5,804,659
[45] Date of Patent: Sep. 8, 1998

[54] PROCESSING OF POLYPHTHALAMIDE MONOFILAMENT

[75] Inventor: John R. Reither, Summerville, S.C.

[73] Assignee: Asten, Inc., Charleston, S.C.

[21] Appl. No.: 768,645

[22] Filed: Dec. 18, 1996

[51] Int. Cl.$^6$ ........................................................ C08F 8/30
[52] U.S. Cl. ........................ 525/178; 428/247; 264/172.11
[58] Field of Search ..................................... 525/165, 178; 428/247; 264/172.11

[56] References Cited

U.S. PATENT DOCUMENTS

| | | |
|---|---|---|
| 3,480,547 | 11/1969 | Van Dyk ................................ 252/12.6 |
| 5,207,873 | 5/1993 | Sanduja et al. . |
| 5,283,110 | 2/1994 | Gardner et al. ........................ 428/227 |
| 5,328,757 | 7/1994 | Kenney et al. ......................... 428/247 |
| 5,407,736 | 4/1995 | McKeon ................................. 428/225 |
| 5,514,472 | 5/1996 | Baris et al. ............................. 428/365 |

*Primary Examiner*—John M. Cooney, Jr.
*Attorney, Agent, or Firm*—Volpe & Koenig, P. C.

[57] ABSTRACT

Monofilaments useful in papermaking fabrics which contain blended polyphthalamide and fluoropolymer and a process for making these monofilaments. These monofilaments have improved dry heat stability, knot strength, loop strength and abrasion resistance. The process reduces polymer shear in the extruder and eliminates polymer build up on the spinneret face.

23 Claims, 4 Drawing Sheets

PROCESSING OF POLYPHTHALAMIDE MONOFILAMENT

BACKGROUND OF THE INVENTION

The present invention relates to monofilaments which contain polyphthalamide and fluoropolymer and a process for making the same. These monofilaments have improved dry heat stability, knot strength, loop strength and abrasion resistance. The process reduces polymer shear in the extruder and eliminates polymer build up on the spinneret face. The monofilaments are useful in papermaking fabrics.

FIELD OF THE INVENTION

Fabrics for papermaking machines vary according to the function they perform in the papermaking process. Papermaking fabrics are generally classified as forming, press, or dryer fabrics.

Papermaking machines begin the papermaking process in the forming section where an aqueous slurry of pulp is dewatered on a forming fabric. The forming fabric carries the aqueous slurry and transforms it into an aqueous paper web. The paper web is then transferred to a press section where it is further dewatered as it passes through one or more press nips. The paper web is then transferred to and carried through the drying section to remove additional water through evaporation.

Monofilament fabrics must withstand the multiple adverse environments found in the papermaking process. The fabrics are in contact with the aqueous paper sheet on one side and the papermaking machine on the other side. Accordingly, forming, press, and dryer fabrics must possess several characteristics to function properly in these environments.

In the forming section of the papermaking process, forming fabrics are required to have a fine mesh weave to separate the fabric from the slurry without marking the paper. Forming fabrics must possess good drainage for the initial water removal that facilitates paper formation. They must be resistant to changes in temperature and degradation resulting from exposure to abrasive chemicals in the paper furnish. Forming fabrics are subject to and must withstand high tensile loads in the machine direction and compressive buckling loads in the cross machine direction.

Press fabrics must allow for consistent dewatering of the paper web, while withstanding compression and elongation forces associated with one or more press nips for dewatering of the paper web.

Dryer fabrics must possess permeability which allows vapor passage through the fabric, and must be resistant to degradation from moist and dry heat. Additionally, dryer fabrics must promote uniform drying of the paper sheets.

Forming, press, and dryer fabrics must be abrasion resistant to withstand both the continuous paper machine and paper sheet contact associated with the papermaking process. They must be structurally stable to support the paper sheet while in use. These fabrics must resist stretch under the tension imposed by the powered rolls which drive the fabric and the equipment which dewaters the paper web.

The process for making the monofilaments used for papermaking fabrics must permit an efficient formation of the monofilaments, while permitting them to function in the adverse papermaking environment. Reduction of extruder screw speed which reduces polymer shear in the extruder is believed to be important for maintaining the strength of the monofilaments. Additionally, the elimination of polymer build up on the spinneret face allows efficient production of monofilaments which are free of extruder defects.

DESCRIPTION OF THE PRIOR ART

Several synthetic polymers are known for use in the papermaking art. Monofilaments used in papermaking fabrics have included several polymer compositions such as polyethylene terephthalate (PET), acid-modified copolyester (PCTA) and polyphthalamide. Each such polymer composition yields particular monofilament characteristics. Additionally, it is known in the art to combine other polymers, such as flouropolymers, to vary the characteristics of the resulting monofilaments.

Polyphthalamides are aromatic polyamides which exhibit particularly good thermal properties and are resistant to moisture and chemical attack. Fluoropolymers are known to impart enhanced knot tenacity in copolyester monofilaments. Several prior art patents disclose the use of fluoropolymers in monofilaments. U.S. Pat. No. 5,283,110 (Gardner et al.) discloses a polymer blend of copolyester and fluoropolymer resins. U.S. Pat. No. 5,407,736 (McKeon) discloses extruded monofilaments of PTFE and polyester resins. U.S. Pat. No. 5,514,472 (Baris et al.) discloses a blend of PET, ethene and tetrafluoroethene.

Although these patents disclose the advantages of fluoropolymer combinations with polyester chemical compositions, they do not teach or suggest monofilaments with improved abrasion resistance, improved dry heat stability, improved knot strength and improved loop strength. Additionally, the prior art does not teach or suggest the advantages of reduced screw speed and die face build up in a process for extruding these monofilaments by the addition of the fluoropolymer to the polyphthalamide at the extruder.

SUMMARY OF THE INVENTION

The present invention concerns monofilaments of a polymer blend of fluoropolymer with polyphthalamide in extruded monofilaments which are particularly suitable for use in papermaking fabrics. The monofilaments of blended fluoropolymer and polyphthalamide provide improved abrasion resistance, improved dry heat stability, improved knot strength and improved loop strength. These are particularly desirable characteristics for monofilaments used in papermaking fabrics.

The invention also allows for an improved process for making monofilaments by adding fluoropolymer to the polyphthalamide resin directly at the extruder. This process allows for a decrease in extruder screw speed which reduces polymer shear in the extruder. Additionally, this process eliminates polymer build up on the spinneret face which allows for improved efficiency in the production of the monofilaments.

The monofilaments of the present invention can be made into papermaking fabrics in accordance with known techniques. The type and density of the fabric structure will depend on the intended papermaking operation. The monofilaments of blended fluoropolymer and polyphthalamide may be used with monofilaments of other chemical compositions.

DESCRIPTION OF THE PREFERRED EMBODIMENTS

This invention relates to monofilaments and a process for making these monofilaments which contain blended polyphthalamide and fluoropolymer. Unless otherwise identified, the polyphthalamide was manufactured by Amoco under the trade name Amodel PXM-95091 and the fluoropolymer was manufactured by Ausimont Corporation under the trade name Polymist F5A.

Figure 1:
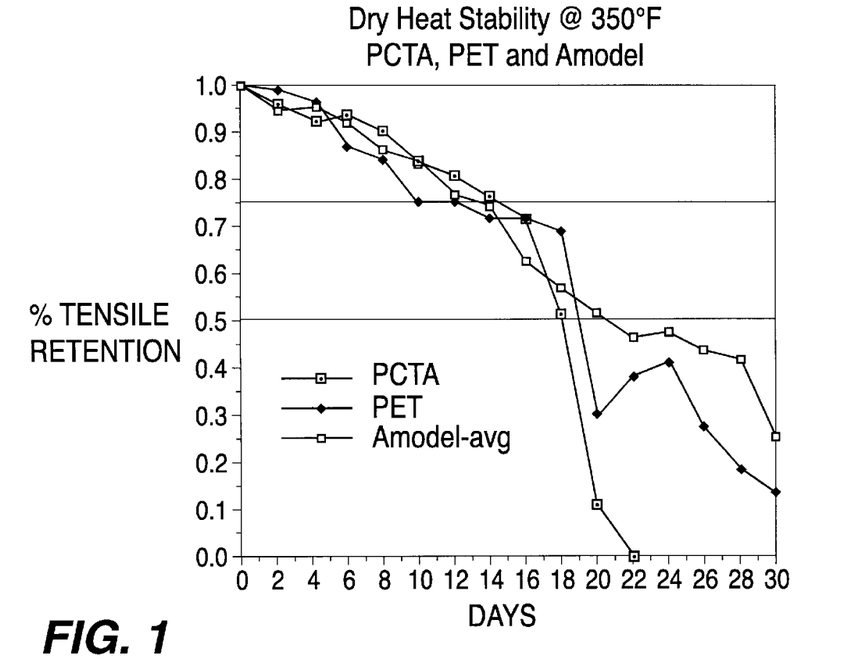
FIG. 1 is a graph showing the dry heat stability of PCTA, PET and polyphthalamide for a 0.5 mm monofilament.

FIG. 1 shows dry heat stability comparison of PCTA, PET and polyphthalamide at 350° F. The compositions were formed into 0.5 mm monofilaments. PET and PCTA show a significant decrease in dry heat stability after 19 days. Polyphthalamide monofilaments remain relatively stable over a 30 day period.

Figure 2:
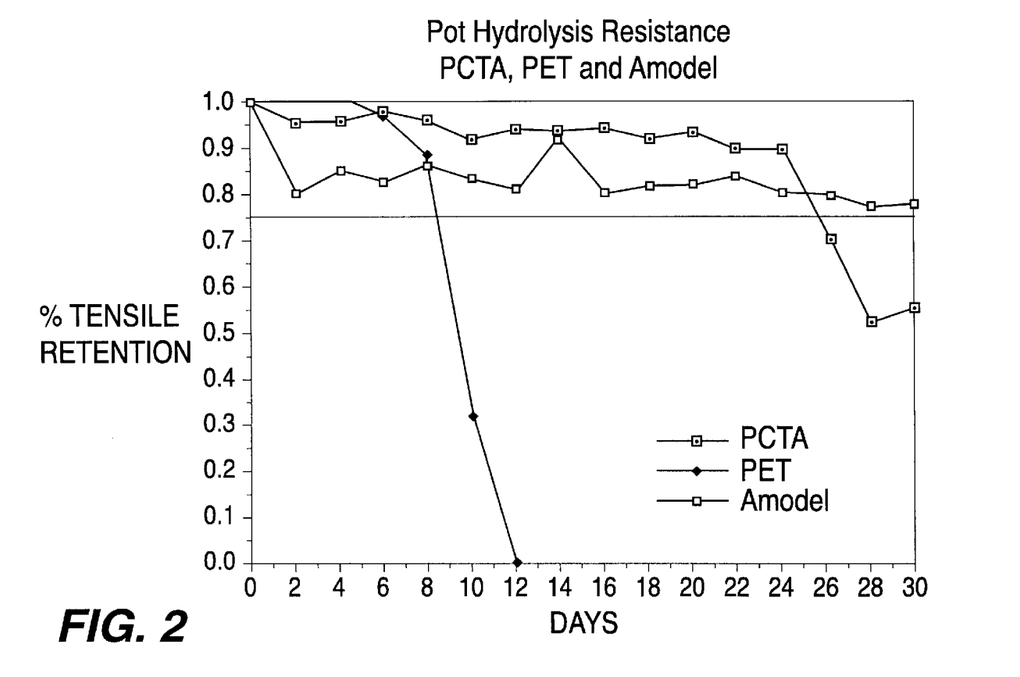
FIG. 2 is a graph showing pot hydrolysis resistance for a 0.5 mm monofilament of PCTA, PET and polyphthalamide.

FIG. 2 shows the pot hydrolysis resistance of PCTA, PET and polyphthalamide over a period of 30 days. PET has a ¾ life of 9 days and the PCTA has a ¾ life of 25 days. Hydrolysis resistance for PET significantly decreases after 10 days, whereas PCTA remains relatively constant over a 28 day period. Polyphthalamide shows an initial drop of tensile strength, but remains essentially unchanged for the next 28 days. This initial drop in the polyphthalamide may be attributed to a plasticization effect of moisture absorption.

EXAMPLES 1–5

In examples 1–5, five different lubricant systems were analyzed for use as a blending component with polyphthalamide in monofilaments for papermaking fabrics. The lubricants were silicone, stearyl stearamide, N,N'-ethylenebisstearamide, copolymer of vinylidene fluoride and hexafluoropropylene, and fluoropolymer blending additives. The polyphthalamide was manufactured by Amoco under the trade name Amodel PXM-95091. In Example 1, silicone additive was blended with polyphthalamide. Example 2 used stearyl stearamide as a blending additive, while Example 3 used N,N'-ethylenebisstearamide. In Example 4, a copolymer of vinylidene fluoride and hexafluoropropylene was used. Example 5 used a fluoropolymer. Each of these trials used the same basic procedure. A baseline of pure polyphthalamide was run through an extruder. The polyphthalamide resin was extruded through a 20 hole spinneret (1.2 mm diameter with a 2.4 mm capillary length) and the condition of the die face was monitored. After two hours, the die face was cleaned and the selected additive was blended with the polyphthalamide to produce monofilaments which were tested.

EXAMPLE 1

Figure 3:
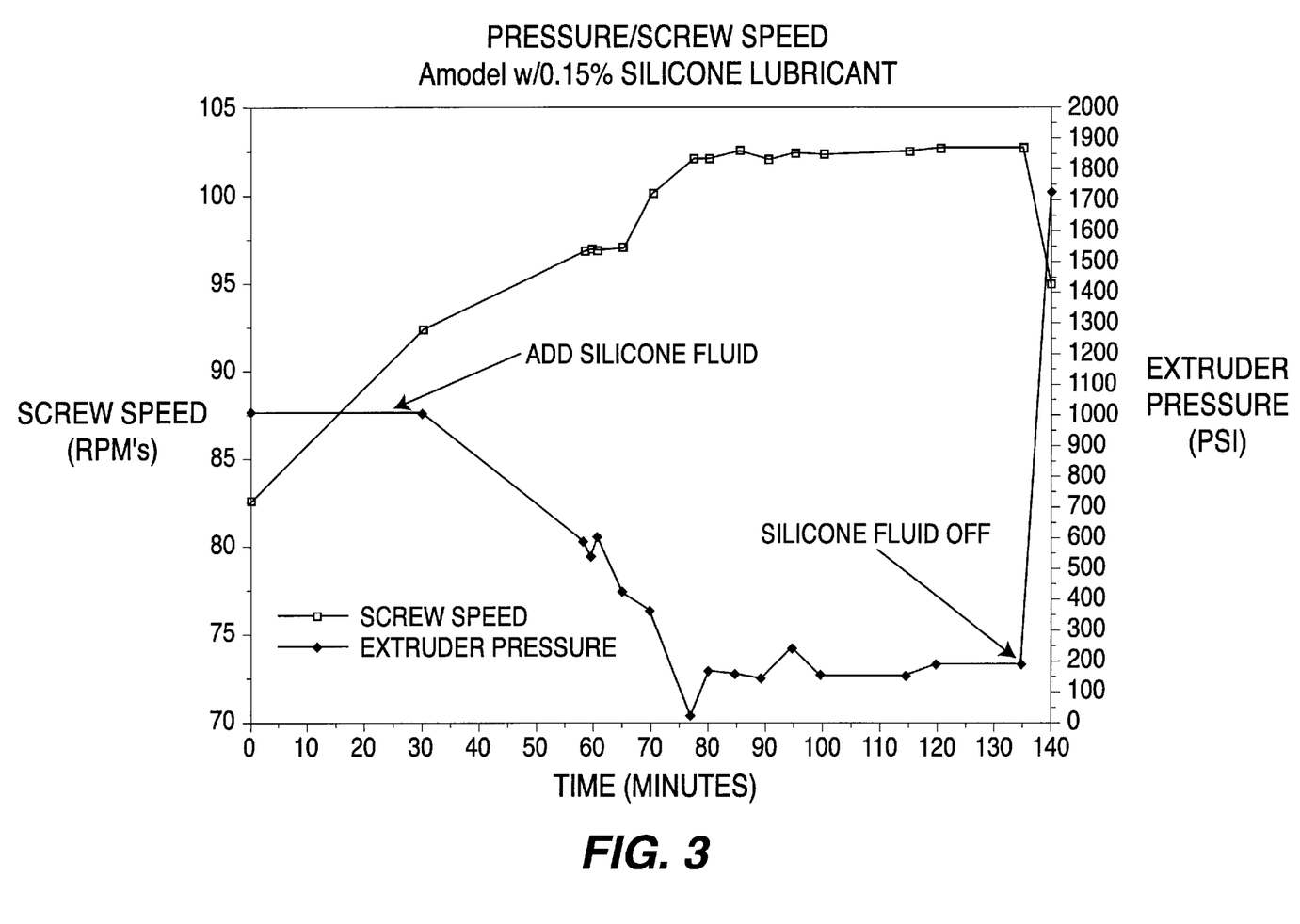
FIG. 3 is a graph showing the screw speed and extruder pressure for the addition of 0.15% silicone lubricant.

After the initial two hours of running polyphthalamide, a silicone fluid manufactured by Dow Corning under the trade name 230 was blended with the polyphthalamide. The silicone fluid was added at the inlet of the extruder at a rate of 0.15% using a peristaltic pump. An immediate increase in extruder screw speed was noted from 82.5 rpm to 92.5 rpm, with a concurrent drop in pressure from 1000 psi. As seen in FIG. 3, the extruder screw speed stabilized at 102 rpm with an extruder pressure of 195 psi. After 1 hour of operation, significant die face build up caused disruptions in monofilament flow and slubs appeared in the monofilaments. After 110 minutes, the addition of silicone oil was stopped. The screw speed and extruder pressure are listed in Table A.

EXAMPLE 2

Stearyl stearamide synthetic wax manufactured by Witco Chemical under the trade name S-180, was blended with polyphthalamide for extrusion. After two hours of processing polyphthalamide, S-180 was added at a rate of 0.25% to the extruder. After 45 minutes, heavy die face build up on the spinneret appeared and increased with time. The build up caused material to flake off the die face onto the monofilament. On a second run, the die face build up caused flaking after 30 minutes. The process conditions for Example 2 are listed in Table B.

EXAMPLE 3

A synthetic wax, N,N'-ethylenebisstearamide, manufactured by Witco Chemical Corporation under the trade name Kenamide W-40, was added to polyphthalamide and extruded. After the initial two hour run of polyphthalamide, 0.25% powdered N,N'-ethylenebisstearamide was added at the feed throat of the extruder. No pressure fluctuations or feeding problems occurred. Within 20 minutes of the initial addition of N,N'-ethylenebisstearamide, heavy black die face build up appeared. In a second run, heavy die face build up appeared within 30 minutes. The die face build up caused material to flake off onto the monofilament. The die face was then cleaned and the extruder processed polyphthalamide without any additives. Slow build up of material on the die face occurred. After 2 hours without the N,N'-ethylenebisstearamide, heavy die face build up was present. The process conditions for Example 3 are listed in Table B.

EXAMPLES 4A and 4B

A fluoroelastomer, manufactured by 3M Corporation under the trade name Dynamar FX-9613, was added at 0.1% to polyphthalamide. After 4 hours, slubs formed in the monofilament and heavy die face build up appeared. The monofilament was yellow and breaks occurred during testing. Examples 4A and 4B list the processing conditions four hours apart, showing the pressure at P4 increasing 356 psi. Process conditions for Examples 4A and 4B are listed in Table B.

EXAMPLES 5A and 5B

A fluoropolymer powder, manufactured by DuPont under the trade name Teflon MP-1000, was preblended with polyphthalamide at 5% and fed into the extruder at 2%, giving a net amount of 0.1% fluoropolymer in the monofilament. An initial run of polyphthalamide was processed through the extruder for 2 hours. Build up on the die face became noticeable after 1 hour and increased with time. After two hours, a heavy build up was present on the die face. Fluoropolymer was then added at the extruder to the polyphthalamide over a 45 minute period. The die face was cleaned and the fluoropolymer additive was continued. After 2 hours of extrusion of the polyphthalamide blended with fluoropolymer, there was no die face build up. The process conditions for Examples 5A and 5B, which were taken one hour apart, are listed in Table B.

TABLE A

EXAMPLE 1

| Screw Speed (rpm) | P1 (psi) | P3 (psi) | Amps | Time (min.) |
|---|---|---|---|---|
| 96.9 | 562 | 283 | 36.7 | +28 |
| 97 | 513 | 303 | 38.4 | +29 |
| 96.9 | 586 | 278 | 40.4 | +30 |
| 97 | 395 | 307 | 36.3 | +35 |
| 100.1 | 337 | 332 | 38.4 | +40 |
| 102.2 | 24 | 317 | 34.7 | +47 |
| 102.2 | 161 | 361 | 38.4 | +50 |
| 102.5 | 156 | 381 | 38 | +55 |
| 102.2 | 146 | 410 | 35.9 | +60 |
| 102.4 | 244 | 439 | 38.4 | +65 |
| 102.3 | 161 | 425 | 36.3 | +70 |
| 102.4 | 151 | 449 | 37.6 | +85 |
| 102.5 | 195 | 495 | 36.3 | +90 |
| 95 | 1725 | 490 | 39.2 | +110 |

TABLE B

| Process Conditions | Ex. 2 | Ex. 3 | Ex. 4A | Ex. 4B | Ex. 5A | Ex. 5B |
|---|---|---|---|---|---|---|
| pump (cm³/min) | 275 | 275 | 200 | 200 | 199.8 | 200 |
| barrel zone 1 (°F.) | 600.2 | 565.2 | 624.4 | 624.4 | 623.7 | 625.7 |
| barrel zone 2 (°F.) | 615.8 | 616.3 | 625.7 | 624.4 | 629.1 | 629.1 |
| barrel zone 3 (°F.) | 590.1 | 589.4 | 586.8 | 583.4 | 612.3 | 612.3 |
| barrel zone 4 (°F.) | 590.2 | 586.8 | 584.1 | 578.0 | 611.0 | 611.0 |
| spinhead 6 (°F.) | 590.2 | 586.8 | 599.5 | 599.5 | 600.2 | 599.5 |
| spinhead 7 (°F.) | 589.4 | 584.1 | 598.9 | 599.5 | 600.2 | 599.5 |
| spinhead 8 (°F.) | 610.7 | 610.3 | 619.7 | 619.7 | 624.4 | 624.4 |
| spinhead 9 (°F.) | 610.7 | 535.6 | 619.7 | 619.7 | 624.4 | 624.4 |
| spinhead 10 (°F.) | 611.2 | 611.0 | 619.7 | 619 | 625.1 | 624.4 |
| pump amps | 51.9 | 57.3 | 78.0 | 82.9 | 70.7 | 65.8 |
| pump speed (cm³/min) | 275.4 | 275.4 | 199.8 | 197.8 | 199.8 | 199.8 |
| extruder amps | 36.2 | 35.1 | 38 | 37.6 | 39.2 | 38.4 |
| extruder speed | 83.1 | 81.9 | 67.5 | 67.7 | 69.9 | 72 |
| pressure 1 (psi) | 1410 | 1373 | 1945 | 1935 | 1720 | 1695 |
| pressure 2 (psi) | 1312 | 1219 | 1500 | 1495 | 1515 | 1510 |
| pressure 4 (psi) | 128 | 202 | 391 | 747 | — | — |
| melt (°F.) | 615.7 | 611.0 | 625.0 | — | — | — |

In Examples 1–4, problems of die face build up and slubs became apparent. In Example 1, silicone fluid produced excessive die face build up, and several processing problems were encountered from over lubrication of the process by the silicone. In Examples 2 and 3, die face build up was apparently exacerbated by the decomposition of the amide lubricants as well as the polyphthalamide. Although these amide lubricants have high amide decomposition temperatures, the decomposition temperature was too low for this application. In Examples 4A and 4B, the inert silica additives in the Dynamar had a tendency to act as a nucleating agent, causing brittle behavior of the monofilament.

In Examples 5A and 5B, the addition of fluoropolymer to polyphthalamide resulted in easy processing compared to other lubricants or non-blended polyphthalamide. The addition of 0.1% fluoropolymer for 2 hours showed no die face build up and there was no interruption of the polymer flow.

EXAMPLES 6A and 6B

Examples 6A and 6B show a comparison of non-blended polyphthalamide monofilaments and polyphthalamide blended with 0.1% fluoropolymer. The 0.1% fluoropolymer was a powdered PTFE, manufactured by Ausimont under the trade name Polymist F5A. Example 6A shows the comparison monofilament of non-blended polyphthalamide, and Example 6B shows a monofilament of 0.1% fluoropolymer and polyphthalamide.

EXAMPLE 6A

Non-blended polyphthalamide was processed into a 0.5 mm monofilament in accordance with process conditions listed in Table C. The extruded monofilament evidenced smooth surface and the absence of voids. An accumulation of die face build up was observed. After four hours of extrusion, the die face build up interfered with the production of the monofilament. The monofilament began evidencing slubs and became erratic in diameter. The monofilament was extruded at an extruder speed of 90 rpm.

EXAMPLE 6B

A monofilament of 0.5 mm polyphthalamide was extruded with fluoropolymer. 5.0% fluoropolymer powder was dry blended with polyphthalamide, with the resulting mixture added at 2% into the extruder via a gravimetric feeder, giving a net amount of 0.1% fluoropolymer. The process conditions are listed in Table C. The monofilament evidenced a smooth surface and the absence of voids. No die face build up was observed. The extruder speed decreased from 89.3 rpm to 65.8 rpm.

The addition of 0.1 percent fluoropolymer to the polyphthalamide monofilament significantly enhanced the processing of the monofilament. The method of addition was found to be critical. Pre-compounding fluoropolymer in polyphthalamide yielded negligible results. Fluoropolymer powder which was added to the surface of the polyphthalamide monofilament gave the maximum advantage. Surface addition of fluoropolymer produced an immediate 26.3 percent screw speed decrease for the same output of monofilament. This resulted in lower melt temperatures and less shear imparted to the polymer. Die face build up, which caused slubs and diameter variation in the non-blended polyphthalamide monofilament, was eliminated. Dry heat stability at 350° F. was increased due to a decrease in shear during extrusion with the addition of fluoropolymer.

The addition of fluoropolymer produced a significant change in extruder speed. Without the fluoropolymer additive, the output was 1.04 pounds/revolution. With the fluoropolymer added, the output increased to 1.42 pounds/revolution. Additionally, the melt temperature and the entrance to the pack was reduced by almost 10° F. No die face build up was present at the conclusion of the 0.5 mm run.

The resultant properties of Examples 6A and 6B are listed in Table D for comparison. Improvements in abrasion resistance, knot strength and loop strength were seen with the addition of fluoropolymer. Abrasion resistance of the fluoropolymer yarn was 3222 compared with abrasion resistance of 2770 for the non-fluoropolymer monofilament. Knot strength was higher for the blended monofilament at 13.9 pounds compared to 10.6 pounds for non-blended monofilament. Loop strength also was higher at 21.2 pounds to 16.9 pounds. Tests conducted on the monofilaments indicated that the fluoropolymer blended monofilament had an inherent viscosity (IV) of 0.94. The non-blended monofilament had an inherent viscosity of 0.91. This was a significant difference for polyphthalamide monofilaments.

Figure 4:
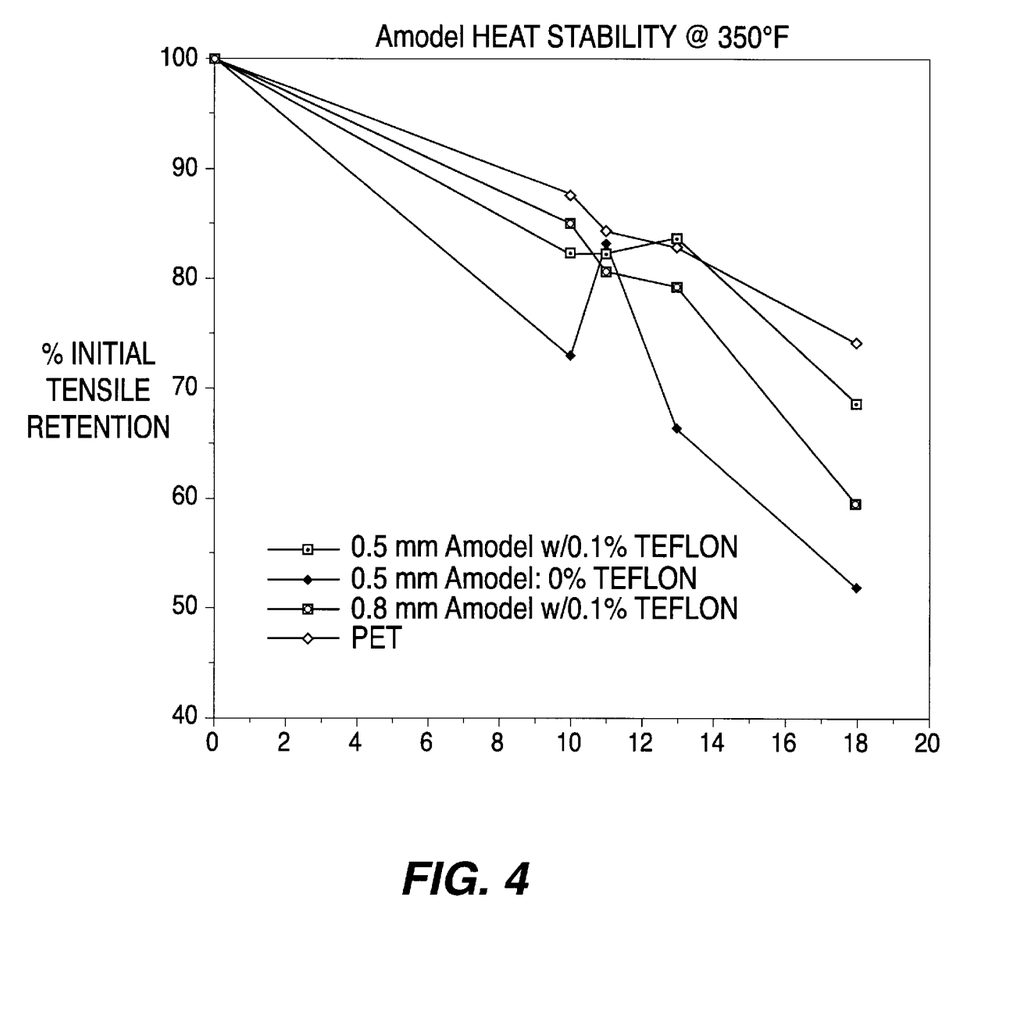
FIG. 4 is a graph showing the heat stability for 0.5 mm polyphthalamide monofilament, 0.5 mm polyphthalamide monofilament with 0.1% fluoropolymer, 0.8 mm polyphthalamide monofilament with 0.1% fluoropolymer, and PET monofilament.

Comparisons of heat stability for a twenty day period are shown in FIG. 4. The heat stability for 0.5 mm polyphthalamide monofilament, 0.5 mm polyphthalamide monofilament with 0.1% fluoropolymer, 0.8 mm polyphthalamide monofilament with 0.1% fluoropolymer, and PET monofilament are shown. Comparison of polyphthalamide monofilaments with fluoropolymer and polyphthalamide monofilaments without fluoropolymer indicates a significant improvement of heat stability with the addition of 0.1% fluoropolymer. A significant difference in tensile retention was measured. After 18 days the fluoropolymer monofilament had a tensile retention of 69%, compared with a tensile retention of 52% for the non-fluoropolymer monofilament.

EXAMPLES 7A–7C 0.1% fluoropolymer was added to polyphthalamide at the extruder for eight hours. No die face buildup was observed and process conditions remained constant. The surface of the yarn was smooth, with a slight increase in abrasion resistance and breaking energy. Examples 7A, 7B and 7C, listed in Table C, represent the process conditions at different times during the eight hour run. Example 7A represents conditions measured after two hours and twenty minutes from the start. Process conditions of Examples 7B and 7C were measured after four hours and seven hours, respectively. After four hours, the die face was clean and no slubs were present in the monofilament. After five hours and twenty minutes, some die face build up occurred but no slubs were observed. After seven hours, there were no slubs in the monofilament and no die face build up. Table D lists the resultant properties for a polyphthalamide monofilament with a 0% fluoropolymer and the 0.1% fluoropolymer of Example 7. As seen in Table D, properties such as abrasion resistance for the 0.1% fluoropolymer monofilament are superior to the monofilament of non-blended polyphthalamide.

TABLE C

| Process Conditions | Ex. 6A | Ex. 6B | Ex. 7A | Ex. 7B | Ex. 7C |
|---|---|---|---|---|---|
| pump (cm³/min) | — | — | 200 | 200 | 200 |
| barrel zone 1 (°F.) | 619.9 | 617.1 | 624.4 | 624.4 | 623.1 |
| barrel zone 2 (°F.) | 590.2 | 590.1 | 631.1 | 629.8 | 629.1 |
| barrel zone 3 (°F.) | 580.0 | 579.8 | 600.9 | 599.5 | 599.5 |
| barrel zone 4 (°F.) | 582.8 | 580.4 | 601.5 | 596.8 | 602.5 |
| flange (°F.) | — | — | 509.4 | 505.4 | 500 |
| neck 1 (°F.) | 579.8 | 580.6 | — | — | — |
| neck 2 (°F.) | 581.2 | 580.8 | — | — | — |
| pump (°F.) | 578.8 | 581.4 | — | — | — |
| die back (°F.) | 611.3 | 612.4 | — | — | — |

TABLE C-continued

| Process Conditions | Ex. 6A | Ex. 6B | Ex. 7A | Ex. 7B | Ex. 7C |
|---|---|---|---|---|---|
| die front (°F.) | 609.6 | 609.5 | — | — | — |
| pack (°F.) | 610 | 610.5 | — | — | — |
| quench (°F.) | 140.3 | 142.1 | — | — | — |
| godet 1 (fpm) | 50 | 50 | 49.4 | 49.4 | 49.4 |
| godet 2 (fpm) | 200 | 200 | 199.8 | 199.8 | 199.8 |
| godet 3 (fpm) | 205 | 205 | 205 | 205 | 205 |
| godet 4 (fpm) | 175 | 175 | 167 | 167 | 167 |
| oven 1 (°F.) | 299.9 | 299.9 | 324.9 | 325.5 | 326.5 |
| oven 2 (°F.) | 400.2 | 399.7 | 400.4 | 399.9 | 400.4 |
| oven 3 (°F.) | 425.0 | 424.8 | 424.7 | 424.7 | 427.3 |
| oven 3 blower (%) | 95 | 95 | — | — | — |
| spin pump amps | 65.7 | 62.1 | 64.6 | 70.7 | 71.9 |
| spin pump speed (cm³/min) | 593.5 | 590.1 | 199.8 | 199.8 | 199.8 |
| extruder amps | 27.9 | 31.2 | 38.8 | 38.4 | 38.8 |
| extruder speed (rpm) | 90.8 | 65.7 | 71.9 | 72.1 | 70.0 |
| pressure 1 (psi) | 1431 | 1851 | 1593 | 1578 | 1666 |
| pressure 2 (psi) | 1481 | 1501 | 1495 | 1500 | 1510 |
| pressure 3 (psi) | 1466 | 685 | — | — | — |
| pressure 4 (psi) | 1958 | 1110 | 312 | 356 | 547 |
| melt temp. 2 (°F.) | — | 619.3 | — | — | — |
| melt temp. 3 (°F.) | — | 612.2 | — | — | — |

TABLE D

| yarn property | Ex. 6A | Ex. 6B | Ex. 7 | non-blended |
|---|---|---|---|---|
| denier | 2022 | 2090 | 2013 | 2146 |
| elong @ 1.75 g/d (%) | 5.84 | 6.62 | 7.0 | 6.1 |
| elong @ 3.0 g/d (%) | 17.48 | 18.74 | 21.1 | 18.3 |
| breaking energy (kg-mm) | 377.5 | 377.3 | 406.7 | 387.6 |
| tenacity (g/d) | 4.21 | 4.03 | 4.0 | 4.0 |
| breaking elongation (%) | 28.2 | 28.3 | 31.6 | 28.1 |
| modulus (g/d) | 53.6 | 54.5 | 50.9 | 53.7 |
| elongation @ 1.0 pound (%) | 0.426 | 0.414 | 0.46 | 0.4 |
| abrasion (cycles/break) | 2770 | 3222 | 3012 | 2577 |
| free shrink (%) | 6.0 | 6.0 | 5.8 | 4.3 |
| diameter (mm) | 0.4996 | 0.5012 | 0.5 | 0.5 |
| knot strength (lbs) | 10.6 | 13.9 | — | — |
| loop strength (lbs) | 16.9 | 21.2 | — | — |

EXAMPLES 8A and 8B 0.2% fluoropolymer was added to polyphthalamide to produce a monofilament. After four hours of extrusion, no die face build up was observed. Table E lists the process conditions of polyphthalamide coated with 0.2% fluoropolymer at the extruder, with Examples 8A and 8B listing the process conditions four hours apart.

EXAMPLES 9A and 9B

Examples 9A and 9B show the process conditions for a monofilament of 0.1% fluoropolymer blended with polyphthalamide. 5% fluoropolymer was blended with polyphthalamide, and the resulting mixture was blended at 2% with polyphthalamide at the extruder. The runs were conducted over a 15 hour period and no die face build up was observed.

Example 9A is the production of a 0.8 mm monofilament. In Example 9B, a 0.7 mm monofilament was produced. Table F lists the process conditions of Examples 9A and 9B. Table G lists the resultant properties of the 0.8 mm and 0.7 mm monofilaments of Examples 9A and 9B.

TABLE E

| Process Conditions | Ex. 8A | Ex. 8B |
|---|---|---|
| pump (cm³/min) | 200 | 200 |
| barrel zone 1 (°F.) | 623.7 | 624.4 |
| barrel zone 2 (°F.) | 623.1 | 623.7 |
| barrel zone 3 (°F.) | 603.6 | 599.5 |
| barrel zone 4 (°F.) | 606.2 | 596.8 |
| spinhead 6 (°F.) | 607.6 | 600.2 |
| spinhead 7 (°F.) | 597.5 | 599.5 |
| spinhead 8 (°F.) | 617.7 | 619.7 |
| spinhead 9 (°F.) | 618.4 | 619.7 |
| spinhead 10 (°F.) | 620.4 | 619.7 |
| godet 1 (fpm) | 49.4 | 49.4 |
| godet 2 (fpm) | 199.8 | 199.8 |
| godet 3 (fpm) | 205 | 205 |
| godet 4 (fpm) | 187 | 187 |
| oven 1 (°F.) | 324.9 | 324.9 |
| oven 2 (°F.) | 399.4 | 399.4 |
| oven 3 (°F.) | 423.6 | 424.7 |
| pump amps | 70.7 | 72.8 |
| pump speed (cm¹/min) | 199.8 | 199.8 |
| extruder amps | 37.6 | 37.6 |
| extruder speed (fpm) | 73.5 | 72.8 |
| pressure 1 (psi) | 1852 | 1111 |
| pressure 2 (psi) | 1471 | 1495 |
| pressure 4 (psi) | 283 | 420 |
| quench (°F.) | 139.1 | 139.6 |

TABLE F

| Process Conditions | Ex. 9A | Ex. 9B | Ex. 10A | Ex. 10B | Ex. 11 |
|---|---|---|---|---|---|
| barrel zone 1 (°F.) | 618.9 | 620.6 | 620.2 | 620.0 | 619.7 |
| barrel zone 2 (°F.) | 591.2 | 590.0 | 595.2 | 589.9 | 595 |
| barrel zone 3 (°F.) | 580.6 | 580.2 | 574.8 | 579.9 | 568.3 |
| barrel zone 4 (°F.) | 581.5 | 578.3 | 566.7 | 582.1 | 563.4 |
| neck 1 (°F.) | 580.4 | 580.2 | 570.0 | 580.2 | 570.1 |
| neck 2 (°F.) | 580.0 | 579.7 | 569.8 | 580.4 | 571.1 |
| pump (°F.) | 580.5 | 579.3 | 570.1 | 581.6 | 570.1 |
| die back (°F.) | 612.0 | 610.3 | 615.4 | 613.4 | 616.2 |
| die front (°F.) | 609.5 | 610.1 | 613.4 | 610.6 | 613.5 |
| pack (°F.) | 610.0 | 610.0 | 614.5 | 610.6 | 615 |
| quench (°F.) | 141.7 | 139.8 | 140.4 | 138.8 | 131.5 |
| oven 1 (°F.) | 350.0 | 350.1 | 350.2 | 350 | 350 |
| oven 2 (°F.) | 400.0 | 400.6 | 365.0 | 365 | 400 |
| oven 3 (°F.) | 425.0 | 425.0 | 399.9 | 400.2 | 425 |
| godet 1 (fpm) | 35.5 | 45 | 47.0 | 47.3 | 36 |
| godet 2 (fpm) | 135 | 172 | 182.3 | 182.3 | 130 |
| godet 3 (fpm) | 136.5 | 176 | 187.9 | 187.9 | 132 |
| godet 4 (fpm) | 115.0 | 149 | 155.3 | 155.3 | 110 |
| oven 3 blower (%) | 95 | 95 | 99 | 99 | 99 |
| extruder speed (fpm) | 64.1 | 63.8 | 65.0 | 65.7 | 60.9 |
| extruder amps | 29.7 | 31.2 | 34.3 | 32.2 | 31.2 |
| spin pump speed (cm³/min) | 590.0 | 590.0 | 590.0 | 590.0 | 590 |
| spin pump amps | 61.4 | 59.3 | 60.7 | 64.3 | 64.3 |
| pressure 1 (psi) | 19.5 | 1941 | 1610 | 1891 | 1489 |
| pressure 2 (psi) | 1491 | 1508 | 992 | 1493 | 1009 |
| pressure 3 (psi) | 948 | 1149 | 384 | 1151 | 500 |
| pressure 4 (psi) | 1391 | 1616 | 745 | 1634 | 881 |
| melt temp. 2 (°F.) | — | — | 613.9–616.1 | 618.2–622.2 | 618.5–621.9 |

TABLE G

| Yarn Property | Ex. 9A | Ex. 9B | Ex. 10A | Ex. 10B | Ex. 11 |
|---|---|---|---|---|---|
| denier | 5290 | 4117 | 3762 | 4013 | 8237 |
| elong @ 1.75 g/d (%) | 8.4 | 7.3 | 8.17 | 8.55 | 10.6 |
| elong @ 3.0 g/d (%) | 23.9 | 21.3 | 23.1 | 23.69 | 25.8 |
| breaking energy (kg-mm) | 963.7 | 681.5 | 857.5 | 828.4 | 1683 |
| tenacity (g/d) | 3.5 | 3.55 | 3.91 | 3.75 | 3.18 |
| breaking elongation (%) | 31.3 | 28.3 | 35.1 | 34.2 | 36.9 |
| modulus (g/d) | 49.9 | 51.5 | 49.1 | 47.9 | 44.6 |
| elongation @ 1.0 pound (%) | 0.12 | 0.169 | 0.23 | 0.223 | 0.011 |
| abrasion (cycles/break) | 13688 | 8528 | 30089 | 10404 | — |

TABLE G-continued

| Yarn Property | Ex. 9A | Ex. 9B | Ex. 10A | Ex. 10B | Ex. 11 |
|---|---|---|---|---|---|
| free shrink (%) | 5.9 | 6.9 | 8.2 | 7.8 | 7.1 |
| diameter (mm) | 0.8009 | 0.7011 | 0.8573 | 0.8404 | 1.0148 |
| knot strength (lbs) | 30.11 | — | 22.82 | — | 44.5 |
| loop strength (lbs) | 56.52 | — | 32.3 | — | 59.3 |

EXAMPLES 10A and 10B

Additional monofilaments were made with 0.1% fluoropolymer and polyphthalamide. Example 10A was the production of a 0.57×0.88 mm warp yarn using a 150 mesh screen. Diameter variation of the warp yarn was 15% from end to end which was reduced to 6% with a decrease in the melt temperature from 619° F. to 615° F. Example 10B was a 1.0 mm filling yarn using a 250 mesh screen. No die face build up was observed on either run. The process conditions for Example 10A and 10B are listed in Table F. Table G lists the resultant properties of the monofilaments in Example 10A and Example 10B.

Figure 5:
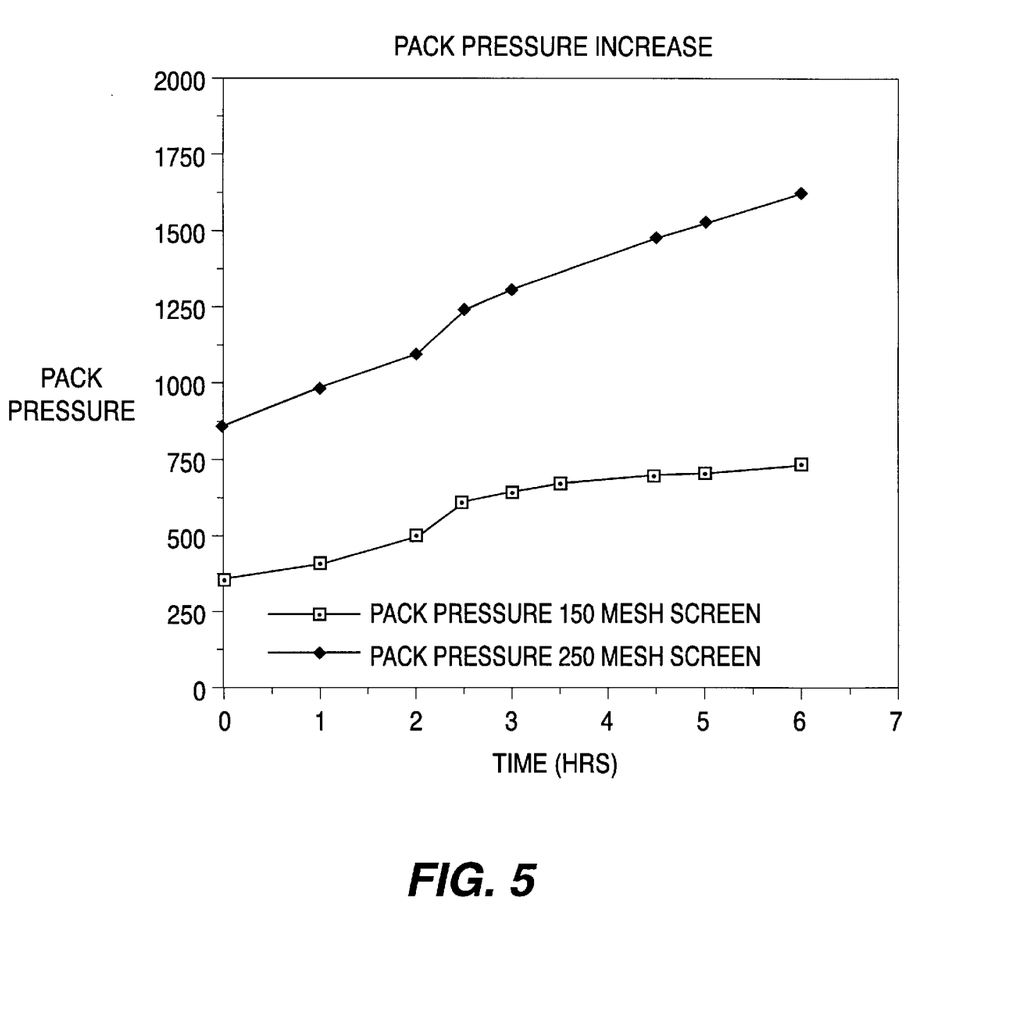
FIG. 5 is a graph showing the pack pressure comparison for a 150 mesh screen and 250 mesh screen.

FIG. 5 shows a comparison of pack pressure for 150 mesh screen and 250 mesh screen. The 250 mesh screen pack pressure remains higher over the entire period of time than the 150 mesh screen. As seen in FIG. 5, pressure rise over time for the 150 mesh screen was significantly less than for the 250 mesh screen.

EXAMPLE 11

A 1.0 mm yarn was made blending 0.2% fluoropolymer with polyphthalamide. Table F lists the process conditions of Example 11, and Table G lists the resultant properties of the monofilament.

EXAMPLES 12A and 12B

Yarns were manufactured with 0.1% fluoropolymer blended with polyphthalamide using a 150 mesh screen. Example 12A represents a 0.6 mm yarn and Example 12B represents a 0.7 mm yarn sample. Table H lists the process conditions of Examples 12A and 12B, and Table I lists the resultant properties of the monofilaments.

EXAMPLES 13A–13E

Runs of 0.1% fluoropolymer with polyphthalamide were used to manufacture 0.38×0.60 mm warp yarn. These runs were done for commercial evaluation and weave samples of the produced yarns. By decreasing the back of the die temperature to reduce the temperature in that zone, the diameter variation ranged ±3.8%. After 20 hours of run time, no die face build up was observed. Table J lists the process conditions of Example 13.

TABLE H

| Process Conditions | Ex. 12A | Ex. 12B |
|---|---|---|
| pack geometry | 1.4 × 2.8 40 holes | 1.4 × 2.8 40 holes |
| spinneret holes | 40 | 40 |
| barrel zone 1 (°F.) | 618.8 | 620.2 |
| barrel zone 2 (°F.) | 590.9 | 590.2 |
| barrel zone 3 (°F.) | 579.7 | 580.2 |
| barrel zone 4 (°F.) | 583.8 | 578.4 |

TABLE H-continued

| Process Conditions | Ex. 12A | Ex. 12B |
|---|---|---|
| neck 1 (°F.) | 579 | 579.1 |
| pump (°F.) | 579.5 | 578.4 |
| die back (°F.) | 614.9 | 615.4 |
| die front (°F.) | 618.1 | 615.7 |
| pack (°F.) | 615.7 | 614.8 |
| quench (°F.) | 615.9 | 615.2 |
| oven 1 (°F.) | 310.1 | 325.0 |
| oven 2 (°F.) | 400.2 | 399.8 |
| oven 3 (°F.) | 425.0 | 435.0 |
| godet 1 (fpm) | 50 | 39.5 |
| godet 2 (fpm) | 209 | 146.0 |
| godet 3 (fpm) | 215 | 150 |
| godet 4 (fpm) | 175 | 133 |
| extruder speed (fpm) | 67 | 67.2 |
| extruder amps | 31.4 | 31.0 |
| spin pump speed (cm$^3$/min) | 585 | 585 |
| spin pump amps | 65.7 | 60 |
| pressure 1 (psi) | 1743 | 1872 |
| pressure 2 (psi) | 1500 | 1492 |
| pressure 3 (psi) | 674 | 1194 |
| pressure 4 (psi) | 1061 | 1648 |
| melt temp. (°F.) | 619.7 | — |

TABLE I

| Yarn Property | Ex. 12A | Ex. 12B |
|---|---|---|
| denier | 3084 | 4059 |
| elong @ 1.75 g/d (%) | 6.81 | 5.6 |
| elong @ 3.0 g/d (%) | 20.69 | 16.8 |
| breaking energy (kg-mm) | 555.8 | 626.5 |
| tenacity (g/d) | 3.91 | 3.71 |
| breaking elongation (%) | 29.3 | 24.9 |
| modulus (g/d) | 51.4 | 52.5 |
| elongation @ 1.0 pound (%) | 0.28 | 0.18 |
| abrasion (cycles/break) | 5252 | 9328 |
| free shrink (%) | 6.6 | 7.5 |
| diameter (mm) | 0.6136 | 0.7048 |
| roundness (%) | ±2.6 | ±2.1 |
| knot strength (lbs.) | 16.7 | 18.65 |
| knot elongation (%) | 22.8 | 16.0 |
| loop strength (lbs.) | 22.8 | 29.21 |
| loop elongation (%) | 10.7 | 10.0 |

EXAMPLE 14

An industrial monofilament of polyphthalamide and 0.125% fluoropolymer was manufactured. Screw speed was reduced to approximately 62 rpm and the control pressure was decreased from 1500 psi to 1000 psi. The yarns were woven into fabrics for papermaking machines. The process conditions are listed in Table K and the resultant properties are listed in Table L. Example 6B with 0.1% fluoropolymer is listed in Tables K and L for comparison.

TABLE J

| Process Conditions | Ex. 13A | Ex. 13B | Ex. 13C | Ex. 13D | Ex. 13E |
|---|---|---|---|---|---|
| pack geometry (mm) | 1.43 × 2.71 | 1.43 × 2.71 | 1.43 × 2.71 | 1.10 × 1.81 | 1.43 × 2.71 |
| spinneret holes | 36 | 36 | 36 | 60 | 36 |
| barrel zone 1 (°F.) | 620.5 | 620.1 | 619.6 | 620.2 | 618.5 |
| barrel zone 2 (°F.) | 590.5 | 590.2 | 589.9 | 590.4 | 589.8 |
| barrel zone 3 (°F.) | 580.3 | 580.1 | 580.0 | 580.7 | 580.8 |
| barrel zone 4 (°F.) | 577.3 | 575.7 | 580.2 | 580.2 | 580.9 |
| neck 1 (°F.) | 580.7 | 580.1 | 581.0 | 580.7 | 578.2 |
| pump (°F.) | 600.1 | 599.8 | 599.6 | 600.6 | 600.7 |
| die back (°F.) | 628.9 | 629.3 | 628.1 | 625.4 | 629.4 |
| die front (°F.) | 635.0 | 635.1 | 635.0 | 629.7 | 634.8 |
| pack (°F.) | 634.9 | 635.1 | 635.0 | 630.1 | 634.7 |
| quench (°F.) | 138.3 | 139.4 | 137.9 | 141.2 | 136.2 |
| oven 1 (°F.) | 312.6 | 325.1 | 325.2 | 350.0 | 349.9 |
| oven 2 (°F.) | 375.1 | 375.0 | 375.0 | 375.2 | 375.1 |
| oven 3 (°F.) | 397.7 | 414.7 | 414.7 | 415.0 | 407.6 |
| godet 1 (fpm) | 101 | 84 | 84 | 50 | 84 |
| godet 2 (fpm) | 405 | 343 | 343 | 200 | 343 |
| godet 3 (fpm) | 420 | 356 | 356 | 205 | 350 |
| godet 4 (fpm) | 320 | 278.5 | 278.5 | 170 | 278.5 |
| extruder speed (rpm) | 66.3 | 57.9 | 57.7 | 64.9 | 56.3 |
| extruder amps | 31.6 | 31.7 | 29.9 | 29.9 | 30.0 |
| spin pump speed (cm³/min) | 570 | 519.9 | 511.9 | 582.9 | 510.1 |
| spin pump amps | 60 | 64.3 | 64.3 | 63.6 | 64.3 |
| pressure 1 (psi) | 1676 | 1865 | 1771 | 1459 | 1465 |
| pressure 2 (psi) | 1501 | 1493 | 1503 | 1482 | 1508 |
| pressure 3 (psi) | 1081 | 774 | 604 | 510 | 396 |
| pressure 4 (psi) | 1515 | 1166 | 984 | 875 | 416 |
| melt temp (°F.) | 633.5 | — | 633.5 | 629.6 | 626.5–631.2 |

TABLE K

| Process Conditions | Ex. 14 | Ex. 6B | Ex. 15 | Ex. 16 |
|---|---|---|---|---|
| barrel zone 1 (°F.) | 622.8 | 617.1 | 620.0 | 620.5 |
| barrel zone 2 (°F.) | 590.2 | 590.1 | 590 | 610.2 |
| barrel zone 3 (°F.) | 579.8 | 579.8 | 580.1 | 605.1 |
| barrel zone 4 (°F.) | 579.9 | 580.4 | 577.4 | 605.0 |
| neck 1 (°F.) | 580.0 | 580.6 | 579.8 | 600.6 |
| neck 2 (°F.) | 579.7 | 580.8 | 579.5 | 600.9 |
| pump (°F.) | 579.4 | 581.4 | 581.2 | 600.1 |
| die back (°F.) | 614.9 | 612.4 | 605.6 | 609.3 |
| die front (°F.) | 615.0 | 609.5 | 605.5 | 610.1 |
| pack (°F.) | 615.3 | 610.5 | 605.1 | 609.0 |
| quench (°F.) | 133.0 | 142.1 | 150.3 | 160.1 |
| oven 1 (°F.) | 300.0 | 299.9 | 325.1 | 300.1 |
| oven 2 (°F.) | 400.0 | 399.7 | 375.2 | 375.1 |
| oven 3 (°F.) | 414.9 | 424.8 | 435.1 | 405.1 |
| godet 1 (fpm) | 50 | 50 | 32.7 | 40 |
| godet 2 (fpm) | 200 | 200 | 120.7 | 150 |
| godet 3 (fpm) | 205 | 205 | 124.0 | 162 |
| godet 4 (fpm) | 175 | 175 | 108 | 140 |
| oven 3 blower (%) | 95 | 95 | 99 | 99 |
| extruder speed (rpm) | 63.8 | 65.7 | 67.2 | 56.6 |
| extruder amps | 31.4 | 31.2 | 29.6 | 29.3 |
| spin pump speed (cm³/min) | 590.0 | 590.1 | 576 | 500.1 |
| spin pump amps | 60.0 | 62.1 | 60.0 | 62.9 |
| pressure 1 (psi) | 1119 | 1851 | 2258 | 1879 |
| pressure 2 (psi) | 1003 | 1501 | — | 1503 |

TABLE K-continued

| Process Conditions | Ex. 14 | Ex. 6B | Ex. 15 | Ex. 16 |
|---|---|---|---|---|
| pressure 3 (psi) | 799 | 685 | 719 | 214 |
| pressure 4 (psi) | 931 | 1110 | 1118 | 519 |
| melt temperature 2 (%) | 621.6 | 619.3 | 604.6 | 609.5 |

EXAMPLE 15

A run of 0.8 mm yarn was conducted with 0.1% fluoropolymer using a 2.2×4.4 36 hole spinneret. The process conditions are listed in Table K and the resultant properties are listed in Table L.

EXAMPLE 16

A 0.30×1.06 mm monofilament with 0.1% fluoropolymer and polyphthalamide was manufactured according to the process conditions listed in Table K, with the resultant properties listed in Table L. Die geometry problems caused a 0.25 mm on the minor axis. Spinneret was 0.63×4.00 mm. PTFE additive speed was 1299 rpm and 389 rpm for polyphthalamide.

TABLE L

| Yarn Property | Ex. 14 | Ex. 6B | Ex. 15 | Ex. 16 |
|---|---|---|---|---|
| denier | 2061 | 2090 | 5180 | 2190 |
| elong @ 1.75 g/d (%) | 6.66 | 6.62 | 5.82 | 6.4 |
| elong @ 3.0 g/d (%) | 18.59 | 18.74 | 18.47 | 17.0 |
| breaking energy (kg-mm) | 363.85 | 377.3 | 822.47 | 450.8 |
| tenacity (g/d) | 4.06 | 4.03 | 3.58 | 4.31 |
| breaking elongation (%) | 28.0 | 28.3 | 26.2 | 29.9 |
| modulus (g/d) | 52.4 | 54.5 | 52.8 | 53.5 |
| elongation @ 1.0 pound (%) | 0.415 | 0.414 | 0.15 | 0.4 |

TABLE L-continued

| Yarn Property | Ex. 14 | Ex. 6B | Ex. 15 | Ex. 16 |
|---|---|---|---|---|
| abrasion (cycles/break) | 3294 | 3222 | 15390 | 13959 |
| free shrink (%) | 6.4 | 6.0 | 6.2 | 6.8 |
| diameter (mm) | 0.5003 | 0.5012 | 0.7888 | 1.09 |
| knot strength (lbs) | — | 13.9 | 25.0 | 11.1 |
| knot elongation (%) | — | — | 13.0 | 13.9 |
| loop strength (lbs) | — | 21.23 | 28.2 | 20.1 |
| loop elongation (%) | — | — | 5.0 | 11.3 |

EXAMPLES 17–19

In Example 17, 38×60 mm monofilaments were manufactured as high tenacity monofilaments using 0.12% fluoropolymer and polyphthalamide. Example 17A is a control sample and Example 17B is a sample to make a higher tenacity yarn. The process conditions of Examples 17A, 17B and a standard product, using the process conditions of Example 13, are listed in Table M. Table N compares the resultant properties of the control sample of Example 17A with high tenacity run of Example 17B.

TABLE M

| Process Conditions | Ex. 17A | Ex. 17B | Standard Product |
|---|---|---|---|
| spinneret holes | 60 | 60 | 36 |
| barrel zone 1 (°F.) | 617.3 | 619.2 | 618.5 |
| barrel zone 2 (°F.) | 589.3 | 591.3 | 589.8 |
| barrel zone 3 (°F.) | 579.6 | 579.6 | 580.8 |
| barrel zone 4 (°F.) | 578.8 | 579.1 | 580.9 |
| neck 1 (°F.) | 580.2 | 579.9 | 578.2 |
| pump (°F.) | 581.4 | 579.8 | 600.7 |
| die back (°F.) | 619.8 | 620.3 | 629.4 |
| die front (°F.) | 619.6 | 620.0 | 634.8 |
| pack (°F.) | 620.0 | 621.2 | 634.7 |
| quench (°F.) | 151.6 | 143.3 | 136.2 |
| oven 1 (°F.) | 350.4 | 350.3 | 349.9 |
| oven 2 (°F.) | 375.7 | 375.1 | 375.1 |
| oven 3 (°F.) | 415.6 | 425.3 | 407.6 |
| godet 1 (fpm) | 50.0 | 41.2 | 84 |
| godet 2 (fpm) | 200 | 200 | 343 |
| godet 3 (fpm) | 205.0 | 205 | 350 |
| godet 4 (fpm) | 170 | 165 | 278.5 |
| extruder speed (rpm) | 59.3 | 55.1 | 56.3 |
| extruder amps | 30.9 | 31.8 | 30.0 |
| spin pump speed (cm³/min) | 540 | 550.0 | 510.1 |
| spin pump amps | 60.7 | 61.4 | 64.3 |
| pressure 1 (psi) | 1535 | 1596 | 1465 |
| pressure 2 (psi) | 1271 | 1212 | 1508 |
| pressure 3 (psi) | 496 | 539 | 396 |
| pressure 4 (psi) | 800 | 786 | 416 |
| melt temperature (°F.) | 617.9 | 617.6 | 626.5–631.2 |

TABLE N

| Yarn Property | Ex. 17A | Ex. 17B |
|---|---|---|
| denier | 1954 | 2016 |
| elong @ 1.75 g/d (%) | 7.0 | 4.6 |
| elong @ 3.0 g/d (%) | 19.5 | 14.1 |
| breaking energy (kg-mm) | 416.8 | 380 |
| tenacity (g/d) | 4.20 | 4.89 |
| break strength (lbs) | 18.0 | 21.7 |
| breaking elongation (%) | 32.0 | 25.9 |
| modulus (g/d) | 51.3 | 58.6 |
| elongation @ 1.0 pound (%) | 0.44 | 0.39 |
| abrasion (cycles/break) | 7534 | 5321 |
| free shrink (%) | 6.0 | 5.9 |
| diameter (mm) | 0.348 × 0.607 | 0.358 × 0.621 |
| knot strength (lbs) | 10.1 | 9.9 |
| knot elongation (%) | 18.9 | 15.7 |

TABLE N-continued

| Yarn Property | Ex. 17A | Ex. 17B |
|---|---|---|
| loop strength (lbs) | 21.9 | 18.67 |
| loop elongation (%) | 21.6 | 10.9 |

EXAMPLES 18A and 18B

Two 0.25×1.06 mm polyphthalamide monofilaments with 0.12% fluoropolymer, Example 18A and Example 18B, were made in accordance with the process conditions listed in Table O. Table P lists the resultant properties of Examples 18A and 18B. PTFE additive speed was 428 and 1299 rpm, respectively. Polyphthalamide speed was 366 and 289, respectively.

TABLE O

| Process Condition | Ex. 18A | Ex. 18B |
|---|---|---|
| barrel zone 1 (°F.) | 619.5 | 620.5 |
| barrel zone 2 (°F.) | 591.3 | 610.2 |
| barrel zone 3 (°F.) | 581.4 | 605.1 |
| barrel zone 4 (°F.) | 578.5 | 605.0 |
| neck 1 (°F.) | 585.4 | 600.6 |
| neck 2 (°F.) | 582.8 | 600.9 |
| pump (°F.) | 597.3 | 600.1 |
| die back (°F.) | 620.6 | 609.3 |
| die front (°F.) | 619.5 | 610.1 |
| pack (°F.) | 621.4 | 609.0 |
| quench (°F.) | 162.2 | 160.1 |
| oven 1 (°F.) | 300.6 | 300.1 |
| oven 2 (°F.) | 373.8 | 375.1 |
| oven 3 (°F.) | 399.5 | 405.1 |
| godet 1 (fpm) | 40 | 40 |
| godet 2 (fpm) | 158 | 158 |
| godet 3 (fpm) | 162 | 162 |
| godet 4 (fpm) | 140 | 140 |
| oven 3 blower (%) | 99 | 99 |
| extruder speed (rpm) | 54.9 | 56.6 |
| extruder amps | 31.8 | 29.3 |
| spin pump speed (cm³/min) | 500.1 | 500.1 |
| spin pump amps | 62.9 | 62.9 |
| pressure 1 (psi) | 1468 | 1879 |
| pressure 2 (psi) | 1195 | 1503 |
| pressure 3 (psi) | 406 | 214 |
| pressure 4 (psi) | 660 | 519 |
| melt temp. 2 (°F.) | 618.4 | 609.5 |
| spinneret | 0.63 × 4.00 | 0.63 × 4.00 |

TABLE P

| Yarn Property | Ex. 18A | Ex. 18B |
|---|---|---|
| denier | 2180 | 2190 |
| elong @ 1.75 g/d (%) | 6.6 | 6.4 |
| elong @ 3.0 g/d (%) | 18.1 | 17.0 |
| breaking energy (kg-mm) | 445 | 450.8 |

TABLE P-continued

| Yarn Property | Ex. 18A | Ex. 18B |
|---|---|---|
| tenacity (g/d) | 4.18 | 4.31 |
| breaking elongation (%) | 30.7 | 29.9 |
| modulus (g/d) | 51.0 | 53.5 |
| elongation @ 1.0 pound (%) | 0.34 | 0.4 |
| abrasion (cycles/break) | 13254 | 13959 |
| free shrink (%) | 5.7 | 6.8 |
| diameter (mm) | 1.11 | 1.09 |
| knot strength (lbs) | 9.3 | 11.1 |
| knot elongation (%) | 14.7 | 13.9 |
| loop strength (lbs) | 20.4 | 20.1 |
| loop elongation (%) | 13.5 | 11.3 |

EXAMPLES 19A–19C

In Examples 19A, 19B and 19C, 1.0 mm polyphthalamide monofilaments with 0.12% fluoropolymer were manufactured. The process conditions for Examples 19A, 19B and 19C are listed in Table Q with the resultant properties of Examples 19A, 19B and 19C listed in Table R. Example 19A used a 2.8×16.8 mm pack. The monofilament had a smooth surface and round appearance with a tenacity of 1.8 g/d. The monofilament of Example 19B had some slubs and a tenacity of 2.9 g/d. In Example 19C, the first draw ratio was decreased from 3.61 to 3.4. Tenacity was 2.8, and elongation went from 26% to 32%, with a percentage shrink of 4.6%.

TABLE Q

| Process Condition | Ex. 19A | Ex. 19B | Ex. 19C |
|---|---|---|---|
| barrel zone 1 (°F.) | 618 | 618 | 619.2 |
| barrel zone 2 (°F.) | 608.4 | 592.5 | 591.6 |
| barrel zone 3 (°F.) | 605.0 | 583.2 | 579.8 |
| barrel zone 4 (°F.) | 606.4 | 583 | 583.8 |
| neck 1 (°F.) | 609.4 | 590.5 | 588.3 |
| neck 2 (°F.) | 610.1 | 591.1 | 589.8 |
| pump (°F.) | 600.9 | 600.2 | 600.1 |
| die back (°F.) | 626.9 | 616.5 | 615.9 |
| die front (°F.) | 624.9 | 613.8 | 615.5 |
| pack (°F.) | 625.6 | 615.4 | 615.3 |
| quench (°F.) | 117.2 | 122.6 | 115.5 |
| oven 1 (°F.) | 349.9 | 350.1 | 340.2 |
| oven 2 (°F.) | 390.9 | 390.7 | 390.2 |
| oven 3 (°F.) | 425.5 | 425.3 | 414.9 |
| godet 1 (fpm) | 36 | 36 | 38 |
| godet 2 (fpm) | 130 | 130 | 130 |
| godet 3 (fpm) | 132 | 132 | 132 |
| godet 4 (fpm) | 110 | 110 | 110 |
| oven 3 blower (%) | 99 | 99 | 99 |
| extruder speed (rpm) | 63.4 | 66.7 | 67.3 |
| extruder amps | 31.4 | 29.1 | 28.2 |
| spin pump speed (cm³/min) | 580 | 580 | 580 |
| spin pump amps | 62.9 | 60 | 62.1 |
| pressure 1 (psi) | 1239 | 936 | 974 |
| pressure 2 (psi) | 1256 | 989 | 992 |
| pressure 3 (psi) | 346 | 438 | 471 |
| pressure 4 (psi) | 564 | 650 | 688 |
| melt temp. 2 (°F.) | 625.2 | 615.0 | 614.9 |

TABLE R

| Yarn Property | Ex. 19A | Ex. 19B | Ex. 19C |
|---|---|---|---|
| denier | 8107 | 7868 | 8151 |
| elong @ 1.75 g/d (%) | 7.5 | 9.5 | 11.8 |
| elong @ 3.0 g/d (%) | — | 29.8 | — |
| breaking energy (kg-mm) | 334 | 1036 | 1358 |
| tenacity (g/d) | 1.86 | 2.81 | 2.85 |
| breaking elongation (%) | 11.5 | 26.4 | 33.3 |

TABLE R-continued

| Yarn Property | Ex. 19A | Ex. 19B | Ex. 19C |
|---|---|---|---|
| modulus (g/d) | 48.4 | 46.2 | 43.9 |
| elongation @ 1.0 pound (%) | — | 0.03 | 0.01 |
| abrasion (cycles/break) | — | — | — |
| free shrink (%) | 5.9 | 5.4 | 4.6 |
| diameter (mm) | 1.0035 | 1.012 | 1.003 |
| roundness (%) | ±3.3 | ±7.0 | ±8.7 |
| knot strength (lbs) | — | — | 35.8 |
| knot elongation (%) | — | — | 27.4 |
| loop strength (lbs) | — | — | 70.3 |
| loop elongation (%) | — | — | 22.6 |

EXAMPLES 20A–20C 0.5 mm monofilaments with varying amounts of fluoropolymer blended with polyphthalamide were manufactured. The monofilament in Example 20A used 0.12% fluoropolymer. In Example 20B, 0.125% fluoropolymer was used. The monofilament of Example 20C used 0.1% fluoropolymer. Table S lists the process conditions of Examples 20A, 20B and 20C. Table T lists the resultant properties of Examples 20A, 20B and 20C.

TABLE S

| Process Condition | Ex. 20A | Ex. 20B | Ex. 20C |
|---|---|---|---|
| barrel zone 1 (°F.) | 619.8 | 622.8 | 617.1 |
| barrel zone 2 (°F.) | 610.2 | 590.2 | 590.1 |
| barrel zone 3 (°F.) | 580.2 | 579.8 | 579.8 |
| barrel zone 4 (°F.) | 584.1 | 579.9 | 580.4 |
| neck 1 (°F.) | 580.7 | 580.0 | 580.6 |
| neck 2 (°F.) | 581.1 | 579.7 | 580.8 |
| pump (°F.) | 579.9 | 579.4 | 581.4 |
| die back (°F.) | 614.9 | 614.9 | 612.4 |
| die front (°F.) | 614.9 | 615.0 | 609.5 |
| pack (°F.) | 615.1 | 615.3 | 610.5 |
| quench (°F.) | 141.1 | 133.0 | 142.1 |
| oven 1 (°F.) | 299.8 | 300.0 | 299.9 |
| oven 2 (°F.) | 400.1 | 400.0 | 399.7 |
| oven 3 (°F.) | 415.0 | 414.9 | 424.8 |
| godet 1 (fpm) | 50 | 50 | 50 |
| godet 2 (fpm) | 200 | 200 | 200 |
| godet 3 (fpm) | 205 | 205 | 205 |
| godet 4 (fpm) | 175 | 175 | 175 |
| oven 3 blower (%) | 95 | 95 | 95 |
| extruder speed (rpm) | 66.5 | 63.8 | 65.7 |
| extruder amps | 32.2 | 31.4 | 31.2 |
| spin pump speed (cm³/min) | 589 | 590.0 | 590.1 |
| spin pump amps | 61.4 | 60.0 | 62.1 |
| pressure 1 (psi) | 1505 | 1119 | 1851 |
| pressure 2 (psi) | 1218 | 1003 | 1501 |
| pressure 3 (psi) | 506 | 799 | 685 |
| pressure 4 (psi) | 700 | 931 | 1110 |
| melt temp. 2 (°F.) | 614.3 | 621.6 | 619.3 |
| melt temp. 3 (°F.) | — | — | 612.2 |

TABLE T

| Yarn Property | Ex. 20A | Ex. 20B | Ex. 20C |
|---|---|---|---|
| denier | 2189 | 2061 | 2090 |
| elong @ 1.75 g/d (%) | 6.19 | 6.66 | 6.62 |
| elong @ 3.0 g/d (%) | 18.0 | 18.59 | 18.74 |
| breaking energy (kg-mm) | 383 | 363.85 | 377.3 |
| tenacity (g/d) | 4.15 | 4.06 | 4.03 |
| breaking elongation (%) | 28.2 | 28.0 | 28.3 |
| modulus (g/d) | 53.9 | 52.4 | 54.5 |
| elongation @ 1.0 pound (%) | 0.41 | 0.415 | 0.414 |
| abrasion (cycles/break) | 4460 | 3294 | 3222 |
| free shrink (%) | 6.7 | 6.4 | 6.0 |

TABLE T-continued

| Yarn Property | Ex. 20A | Ex. 20B | Ex. 20C |
|---|---|---|---|
| diameter (mm) | 0.5074 | 0.5003 | 0.5012 |
| knot strength (lbs) | 8.6 | 6.4 | 13.9 |
| loop strength (lbs) | 15.5 | 11.1 | 21.23 |
| knot elongation (%) | 15.4 | 13.4 | 24.0 |
| loop elongation (%) | 12.5 | 2.5 | 15.4 |

The foregoing examples illustrate particular embodiments of the invention and provide monofilaments suitable for use in papermaking fabrics, particularly forming and dryer fabrics, and are not intended to limit the scope of the invention.

What is claimed:

1. A monofilament of a polymer blend comprising of up to about 2 weight percent fluoropolymer and;
   a complimentary amount of polyphthalamide to total 100 weight percent.

2. The monofilament of claim 1 wherein said fluoropolymer is present in an amount up to about 1 weight percent.

3. The monofilament of claim 1 wherein the fluoropolymer is present in a range from about 0.1 to about 0.2 weight percent.

4. The monofilament of claim 1 wherein the fluoropolymer is PTFE.

5. The monofilament of claim 1 wherein the fluoropolymer is present in a range from about 0.01 to about 2 weight percent.

6. A papermakers fabric including monofilaments comprised of from about 0.01 to about 2 weight percent fluoropolymer blended with
   a complimentary amount of polyphthalamide to total 100 weight percent.

7. The papermakers fabric of claim 6, wherein the fluoropolymer is present in an amount of about 0.1 weight percent to about 1 weight percent.

8. The papermakers fabric of claim 6 wherein the fluoropolymer is present in an amount of about 0.1 weight percent to about 0.2 weight percent.

9. The papermakers fabric of claim 6 wherein the fluoropolymer is PTFE.

10. A method for making a monofilament useful in papermaking fabrics, the monofilament comprising a polymer blend of fluoropolymer and polyphthalamide, the method for making the monofilament comprising the steps of:
    preparing a polyphthalamide resin for extrusion into a monofilament;
    transporting the resin to an extruder;
    applying up to about 2 weight percent fluoropolymer to the surface of said polyphthalamide at the extruder; and
    extruding the polyphthalamide and fluoropolymer to form a blended monofilament.

11. The monofilament of claim 1, wherein the fluoropolymer was blended with the polyphthalamide at the monofilament surface at an extruder during the process of making the monofilament.

12. The monofilament of claim 11 wherein the fluoropolymer is present in the monofilament in a range from about 0.01 to about 2.0 weight percent.

13. The monofilament of claim 12 wherein the fluoropolymer was added in powder form at the extruder.

14. The monofilament of claim 12 wherein the fluoropolymer is present in the range from about 0.1 to about 0.2 weight percent.

15. The monofilament of claim 11 wherein the fluoropolymer is PTFE.

16. The papermakers fabric of claim 6, wherein the fluoropolymer was blended with the polyphthalamide at the monofilaments' surfaces at an extruder during the process of extruding the monofilaments.

17. The papermakers fabric of claim 16 wherein the fluoropolymer was added in powder form at the extruder.

18. The papermakers fabric of claim 16 wherein the fluoropolymer is present in a monofilament in an amount of about 0.1 weight percent to about 1.0 weight percent.

19. The papermakers fabric of claim 18 wherein the fluoropolymer is present in a monofilament in an amount of about 0.1 weight percent to 0.2 weight percent.

20. The papermakers fabric of claim 16 wherein the fluoropolymer is PTFE.

21. A method of claim 10 wherein the fluoropolymer is present in the monofilament in an amount up to about 1 weight percent.

22. A method of claim 10 wherein the fluoropolymer is present in the monofilament in a range from about 0.1 to about 0.2 percent.

23. A method of claim 10 wherein the fluoropolymer is PTFE.

* * * * *